(12) United States Patent
Schneider

(10) Patent No.: US 12,409,951 B2
(45) Date of Patent: Sep. 9, 2025

(54) BIOMETRIC REGISTRATION AND VERIFICATION DEVICE FOR AIRCRAFT SERVICE AND MAINTENANCE

(71) Applicant: SCHNEIDER ADVANCED BIOMETRIC DEVICES CORP., Wilmington, DE (US)

(72) Inventor: David Lyle Schneider, Hong Kong (CN)

(73) Assignee: SCHNEIDER ADVANCED BIOMETRIC DEVICES CORP., Wilmington, DE (US)

( * ) Notice: Subject to any disclaimer, the term of this patent is extended or adjusted under 35 U.S.C. 154(b) by 273 days.

(21) Appl. No.: 17/729,468

(22) Filed: Apr. 26, 2022

(65) Prior Publication Data

US 2022/0250770 A1 Aug. 11, 2022

Related U.S. Application Data

(63) Continuation of application No. PCT/IB2020/061219, filed on Nov. 27, 2020.

(60) Provisional application No. 62/891,868, filed on Nov. 29, 2019.

(51) Int. Cl.
*B64F 5/60* (2017.01)
*G06F 21/32* (2013.01)
*G07C 5/00* (2006.01)
*H04L 9/32* (2006.01)

(52) U.S. Cl.
CPC ............... *B64F 5/60* (2017.01); *G06F 21/32* (2013.01); *G07C 5/006* (2013.01); *G07C 5/008* (2013.01); *H04L 9/3231* (2013.01)

(58) Field of Classification Search
CPC .......... G06F 21/30; G06F 21/31; G06F 21/32; H04L 9/3231; B64F 5/60; G07C 5/006; G07C 5/008
See application file for complete search history.

(56) References Cited

U.S. PATENT DOCUMENTS

| | | | |
|---|---|---|---|
| 10,589,873 B1 * | 3/2020 | Lawson | B64D 45/0015 |
| 11,030,828 B2 * | 6/2021 | Amit | G06F 16/25 |
| 2005/0055239 A1 * | 3/2005 | Farmer | G06Q 10/063 705/305 |
| 2010/0287601 A1 * | 11/2010 | Croize | G06F 21/35 726/4 |
| 2012/0130563 A1 * | 5/2012 | McBain | B64D 45/0059 701/3 |

(Continued)

OTHER PUBLICATIONS

Continuous biometric authentication for authorized aircraft personnel: a proposed design, Cassandra M. Carrillo, Thesis paper, Naval Postgraduate School (Year: 2003).*

*Primary Examiner* — Shanto Abedin
(74) *Attorney, Agent, or Firm* — Jonathan Kidney; Intelink Law Group, PC

(57) ABSTRACT

A system of verifying the performance of a maintenance event on an aircraft includes a series of electronics units, each being associated with an individual in the verification chain for the maintenance event. Each electronics unit is adapted to electronically confirm the identity of the the individual and record the individual's confirmation. The electronics units are interconnected to facilitate the passage of confirmations among them. The resulting set of confirmations may stored and provided to one or more agencies for review and acting upon as needed.

11 Claims, 10 Drawing Sheets

(56) References Cited

U.S. PATENT DOCUMENTS

| | | | |
|---|---|---|---|
| 2014/0143839 A1* | 5/2014 | Ricci | H04N 21/25858 |
| | | | 726/4 |
| 2015/0134194 A1* | 5/2015 | Beaujard | G07C 5/0808 |
| | | | 701/31.7 |
| 2020/0126324 A1* | 4/2020 | Hutchins | G07C 5/0808 |
| 2020/0184739 A1* | 6/2020 | Nathan | G06Q 10/20 |
| 2020/0358761 A1* | 11/2020 | Ya | H04L 63/0861 |
| 2021/0150834 A1* | 5/2021 | Bates | E05B 47/0607 |

* cited by examiner

ND VERIFICATION DEVICE FOR AIRCRAFT
SERVICE AND MAINTENANCE

PRIOR REFERENCES

This application claims benefit of U.S. 62/891,868 provisional application dated Nov. 29, 2019.

BACKGROUND OF THE INVENTION

The present invention in the field of digital document workflow and quality assurance systems and processes. The digital signature field was pioneered by Adobe Inc. and others, setting standards for document formats and signatures with PDF and related electronic digital signature documents.

Handheld devices of various capabilities exist in the field. For example, U.S. Pat. No. 7,512,254 to Symbol Technologies teaches a method and system for authenticating identity of a person using a portable device. This system uses image scanning, processing and identification based on biometric identification of an individual. US2011-0188711 to Hitachi teaches a fingerprint or hand reader mechanism that activates an infrared capture of vein identification for purpose of biometric individual identification. U.S. Pat. No. 8,531,710 to Google relates generally to portable devices communication to peer devices for accessing a database or electronic data storage. Microsoft Technology Licensing's U.S. Pat. No. 10,049,272 (check number), discloses a high-reliability iris-capture imaging systems for biometric individual identification.

U.S. Pat. No. 7,702,435 to Honeywell International teaches automated monitoring systems for aircraft maintenance, and in particular describes maintenance process for troubleshooting and replacing line replaceable components and human process.

There remains a need for an improved apparatus for an apparatus and system for aircraft maintenance, service and inspection protocols and routines which provides biometric identification of the involved personnel.

BRIEF SUMMARY OF THE INVENTION

In accordance with the foregoing, the present invention is a biometric registration and verification method, apparatus and system for aircraft service, maintenance and quality inspections, in which a plurality of supervisory or other individuals associated with the procedure to be performed are required to validate or "sign off" that the procedure has been performed as required. . . . The invention can provide authentication, validation and real-time recordation of such sign-offs at the time of performance, even in situations where the equipment to be attended to may be regulated and/or have intensive inspection requirements. Various types of biometric signature confirmations may be utilized, including fingerprint, face-id, voice-id and eye-identifier mechanisms.

BRIEF DESCRIPTION OF THE DRAWINGS

A fuller understanding of the invention will be realized upon consideration of the following detailed description of embodiments of the invention, when taken in conjunction with the annexed drawings, in which.

DETAILED DESCRIPTION OF THE INVENTION

Figure 1:
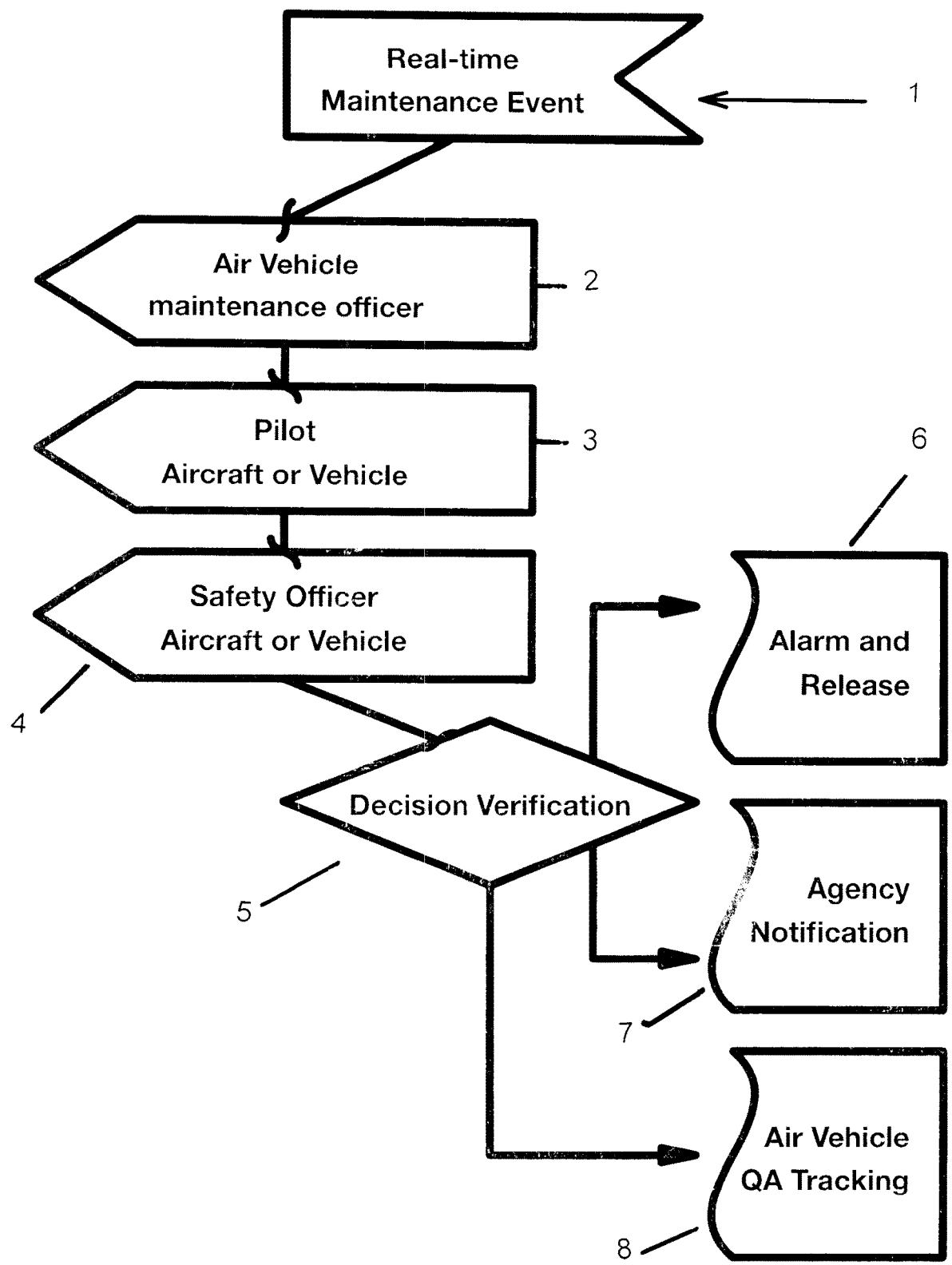
FIG. 1 is a flow diagram illustrating a typical conventional workflow method for sign-off documentation incorporating an electronic system of the present invention with automated notification to operational and oversight authority agencies.

The present invention is a biometric registration and verification apparatus and system for aircraft service and maintenance. In preferred embodiments the apparatus may utilize hand-held devices, permanently mounted console devices, as well as combined hybrid systems where mobile devices can interconnect and dock with permanent mount devices.

In an illustrative embodiment a ground maintenance crew and chief, who are responsible authorities for maintenance and review of maintenance transactions, hand-off a maintenance transaction to one or more of the aircraft's pilot, co-pilot, and/or air crew who are the responsible authorities for the aircraft operation. The invention provides for authenticated sign-off from all parties involved in the transaction. The physical hardware apparatus and units of the invention may be integrated into the vehicle, platform or aircraft or may be mobile units in the possession of the appropriate individuals, allowing the responsible parties to be notified with real-time events and provide their verified signatures through multiple formats, including biometric signature authentication. Other authentication protocols may include hand-signed authentication. A currently preferred embodiment as detailed herein, however, here records and verifies with at least a voice-activated biometric signature.

The incorporated devices may include reader mechanism hardware and face-scan identification as known in the art that accompanies recorded received audio records from the individuals upon event transactions for future review and audit. Collectively, these "signatures" provide a record for the verification and non-reputability of the responsible individuals/authorities performing the required human interactions in the form of the sign-offs. The present methodology, system and apparatus provide for real-time delivery of these sign-off transactions to multiple parties. The apparatus and system can notify the airline, regulatory agencies of the jurisdiction, as well as aircraft manufacturer QA systems, with real-time daily sign-offs, including technical event details from air vehicle integration.

An integrated embodiment can include apparatus devices mounted in a pilot's cockpit control surfaces, with secondary apparatus mounted in the flight crew's (co-pilot's or secondary officer's) control surfaces, and additional apparatus mounted in safety crew control surfaces. Additionally, ground maintenance apparatus devices may be mounted in the airframe, preferably at ground level at external maintenance access points. The system may also comprise a combination of hand-held and mounted devices, with one or more of the hand-held devices being able to be docked or otherwise configured for serial data communication integration.

Interconnection between devices can also be accomplished through standard 1553 or fiber interface data bus standards, including near-field radio connections, infrared or other modalities as known in the art.

The invention can process and audit routine maintenance events, as well as related events such as pre-flight checks, maintenance hand-overs and final approvals, including pilot-to-maintenance crew communications, all of which can be recorded, authenticated and automatically audited into documentation, as further detailed infra.

FIG. 1 illustrates a typical workflow of the invention. As shown therein, a maintenance event 1 is entered into the system. The event includes numerical code, a text description of the maintenance event being performed, and optionally documentation for the steps, procedures or other contents review and the required authorized "legal" signatures, and may be, for example, a work order, an inspection request, a maintenance checklist or other document that requires sign-offs by responsible individuals. The event is transmitted electronically as known in the art. In a presently preferred embodiment, each individual in the verification chain, such as a maintenance officer 2, the pilot or operator 3 of the aircraft or vehicle upon which the maintenance is being performed, and an appropriate safety officer 4, is provided with a device into which the event can be loaded. As previously stated, each device may be incorporated into the console at which the individual is located or may be in the form of a mobile deice, optionally hand-held, carried or otherwise in the possession of the individual. As shown, each individual sequentially provides the needed verification sign-off, the verification is transmitted to the other individuals in the chain such that each can attend to the verification in a logical order. The system can provide that the verifications can be sent to all other verifying individuals in parallel, or may provide that the verifications are sent down the line only to the next individual in the overall verification chain. . . . After passage to all of the identified individuals and capture of all the signatures, the signatures are validated by the system at 5, and the total verification file can then be transmitted to one or more appropriate external systems, such a an alarm system 6 that can allow "release" of the aircraft from the maintenance of other procedure being performed or issue an alert that all is not in order and a defective condition must be remedied-further; supervisory agency notification 7, or a documentation agency 8 for maintaining quality assurance records for the aircraft. The various external systems may, of course, be integrated into a single receiving facility, or may be further divided or segregated as appropriate for the specific vehicle or aircraft and established maintenance and recordation protocols.

Figure 2:
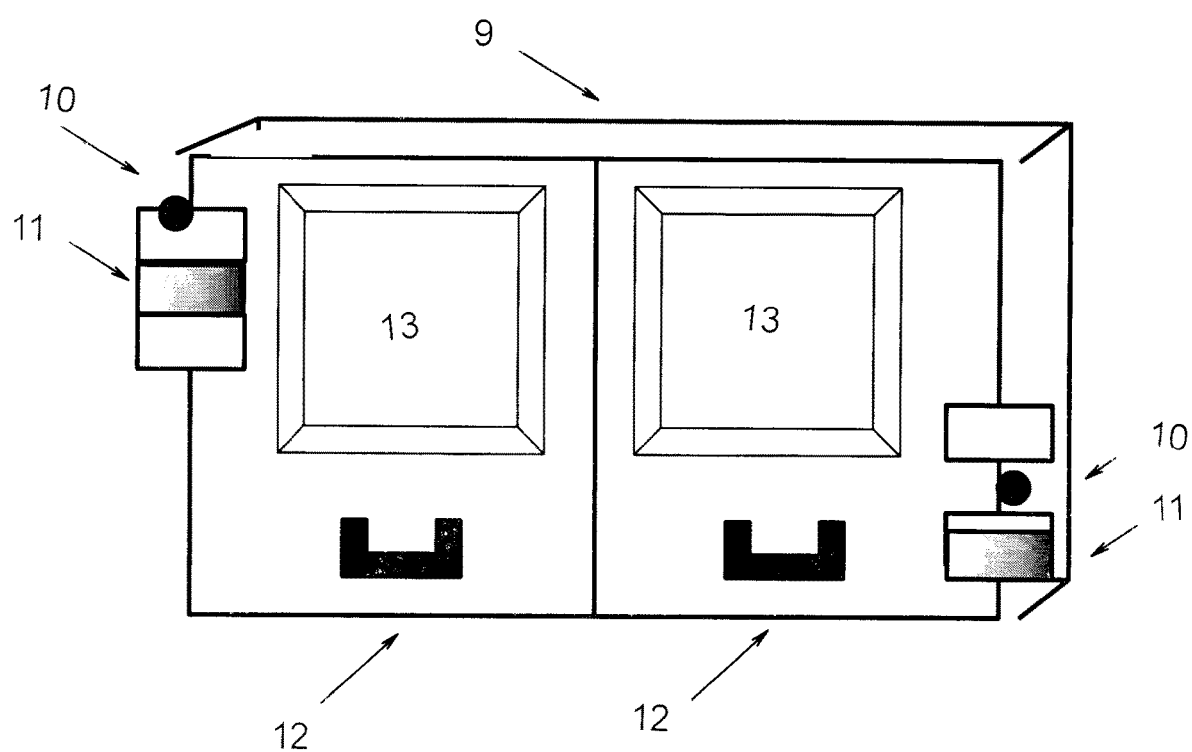
FIG. 2 is an illustration of the general construction of an electronics unit usable in connection with the present invention, which can be developed as a portable device or incorporated into a console.

FIG. 2 illustrates the nature of a representative mobile electronics unit 9. Such a unit may comprise a compact case or casing incorporating one or more camera modules 10, microphones/speakers 11 and finger and hand-print reader modules 12, allowing the user to enter a verification of the maintenance event by a variety of input methods, such as voice pattern recognition, eye or retinal signature, fingerprint or the like, reach of which is transmitted to and is capable of confirmation and verification by, the decision verification module of the system. The unit may also be provided with a screens to allow text and images, such as the maintenance steps to be performed, system information and notices, such as prior verifications, to be presented to the user. The unit is also provided with a microprocessor suitably programmed, a memory system, a communications module and a power supply, all as may be known and interconnected in manners known in the art. The functionality of the mobile electronics units can also be incorporated into an aircraft or vehicle of the type subject to the maintenance events contemplated to be entered in the system. For example, the functionality of the mobile unit to be utilized by the pilot of an aircraft can be incorporated into the aircraft's pilot console.

Figure 3:
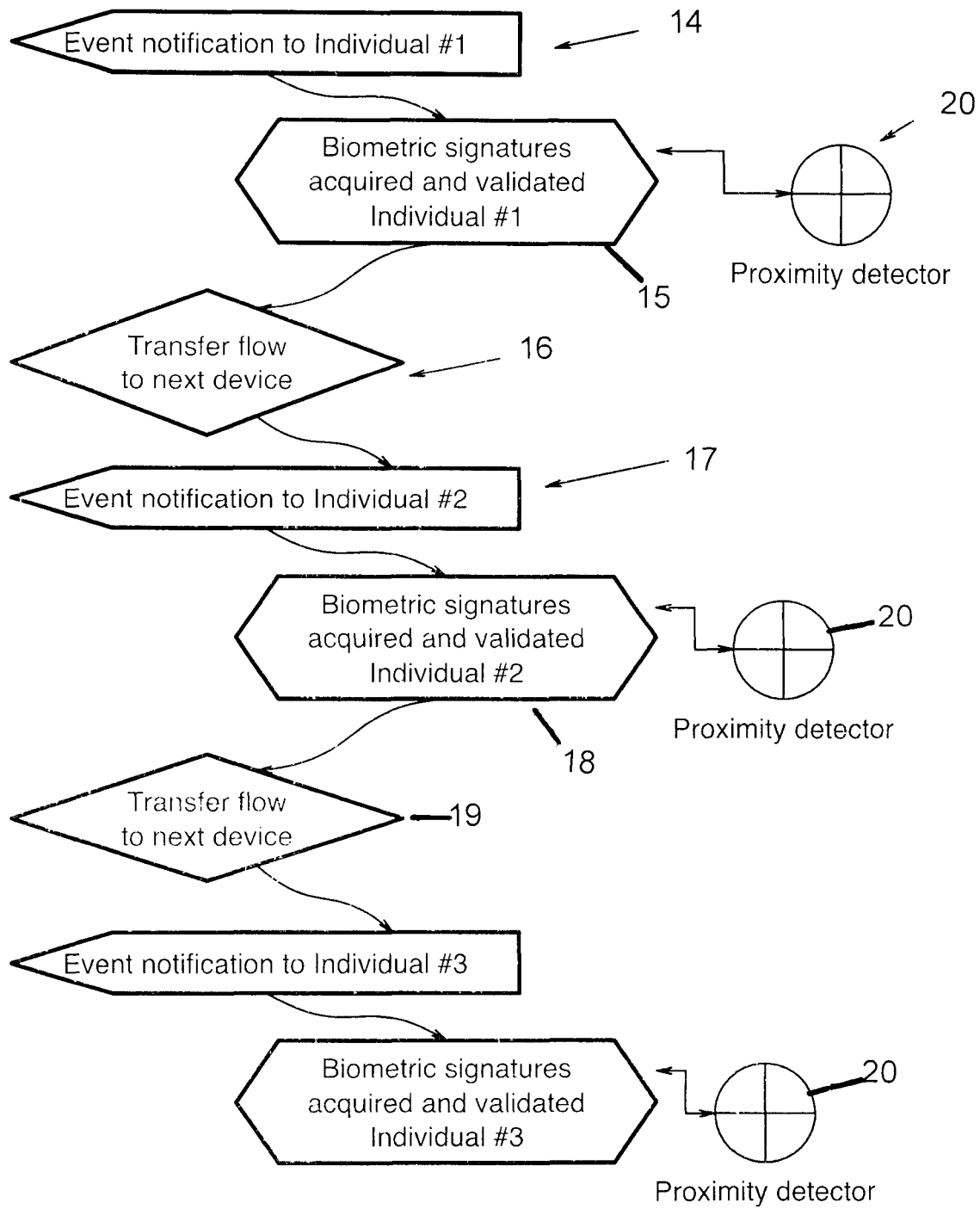
FIG. 3 is a flow diagram illustrating the operation of a of the present invention incorporating a cascading daisy-chain process for capturing, recording and validating sign-offs across multiple devices while auditing physical proximity and near-far authenticity.

FIG. 3 further details a cascading daisy-chain verification process as may be embodied in the system. The electronics unit associated with the first individual in the verification chain receives the maintenance notification at 14. The unit issues a sign-off validation request, either aurally and/or visually, to the individual and receives and validates the sign-off verification at 15, including validation of biometric inputs supplied by the individual. Once validated, a validation data packet is prepared is passed at 16 to the electronics unit associated with the next individual in the overall validation process and notification and a validation request to the individual is provided at 17. That individual provides the needed responses which are validated at 18. The data packet is updated and passed to the next device at at 19 for identical reporting and processing by the unit associated with the next individual, as illustrated. While the process illustrated shows three devices, the validations may be performed by as many individuals as are required by the procedure being validated, each individual having access to his own electronics unit. The transfer flow includes the signatures in a encoded and encrypted form to preserve their integrity.

In addition to the verification input devices, each electronics unit may include a hardware proximity detection module 20. The proximity detection module is adapted to detects the presence of all the electronics units associated with the transaction and the distance to the other units. Towards such ends each electronic unit may have a unique identification number, allowing the proximity detector to verify the other units' identity and participation in the maintenance activity, providing confirmation that a verification is actually being conducted by an individual who is physically located in proximity to the other individuals and thus in the proximity of the vehicle for which the verifications are associated. The proximity sensor can, for example, be GPS-based. In one embodiment, the proximity detector of the electronics unit associated with the second individual in the chain will confirm the location of the first individual and validate that proximity as part of the validation of the second individual. Upon passage of the updated data package to the electronics unit associated with the third individual, the proximity detector associated with that individual likewise confirms the location of both the first individual and the second individual from which the data packet was received and includes that data in the updated data packet.

While the "daisy chain" model is preferred, it is also possible that all individuals in the chain be provided with the maintenance event simultaneously, with the verifications being shared with all the other individuals and sent for verification as shown in FIG. 1. In such a case the decision module in FIG. 1 will be programmed appropriately to determine when all individuals in the chain have sent their verifications.

Figure 4:
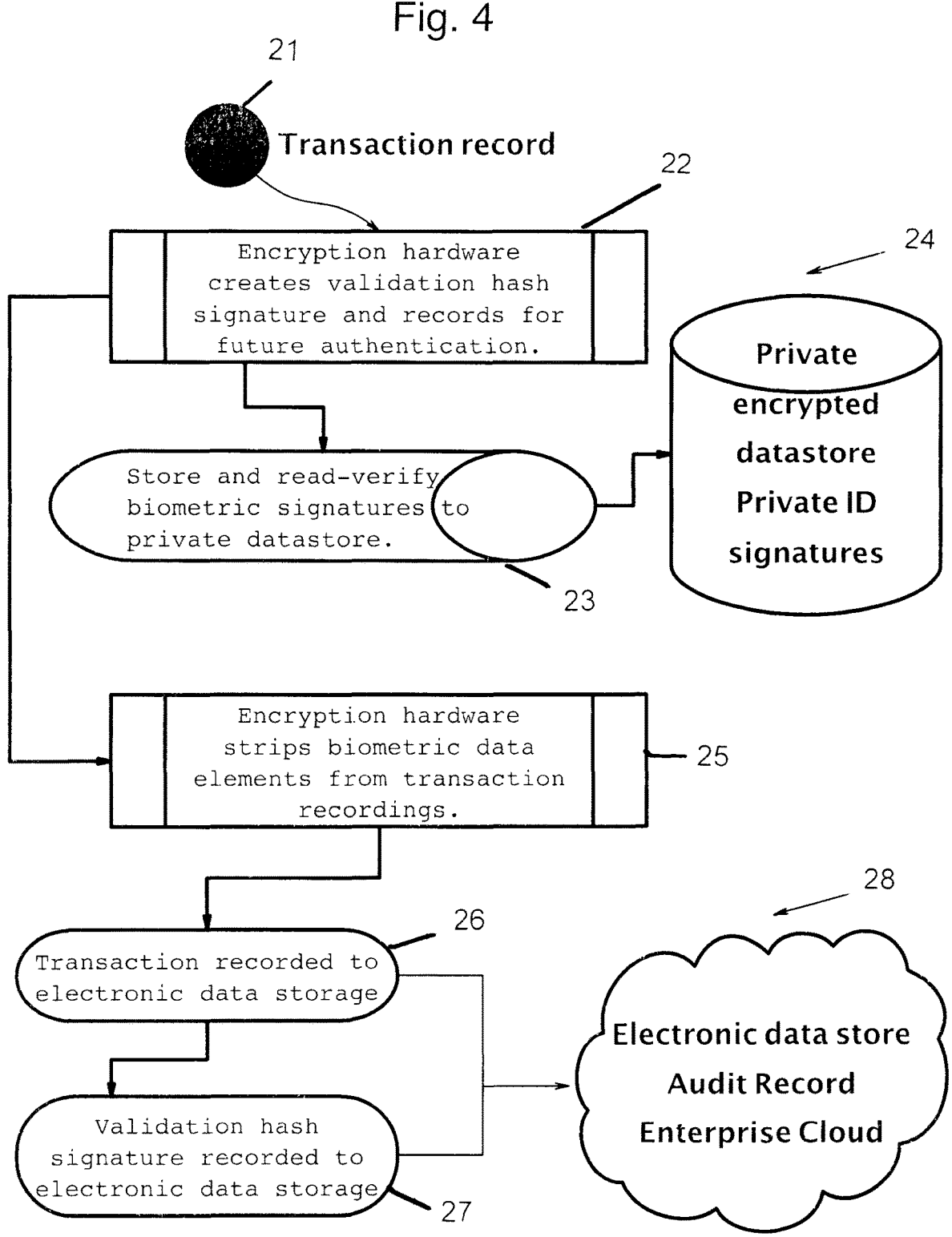
FIG. 4 is a flow diagram illustrating the invention's process for recording validation transactions into electronic data stores, with mandatory access control for private biometric confidential data.

FIG. 4 shows an illustrative embodiment for the recording of transactions into electronic data stores once the personnel validation procedure has been completed. The completed transaction record 21 is received by a reception facility that generates at 22 an encrypted validation hash signature as known in the art to ensure the integrity of the received transaction's data, along with unique transaction serial number. The signatures are validated at 23 and is entered into a private electronic datastore 24, preferably along with the original raw biometric data from the transaction. The original received record, along with its validation hash signature format and identifying transaction serial number is also forwarded to software at 25 that removes the biometric data from both the original and encrypted records, allowing the stripped record to be shared with public and non-confidential databanks. The remaining unencrypted transaction record and transaction number is stored at 26, while the remaining encrypted record and assigned transaction number is stored at 27. Both records and transaction number can also be delivered with confirmation to other remote reception and storage facilities as may be desired at 28.

Figure 5:
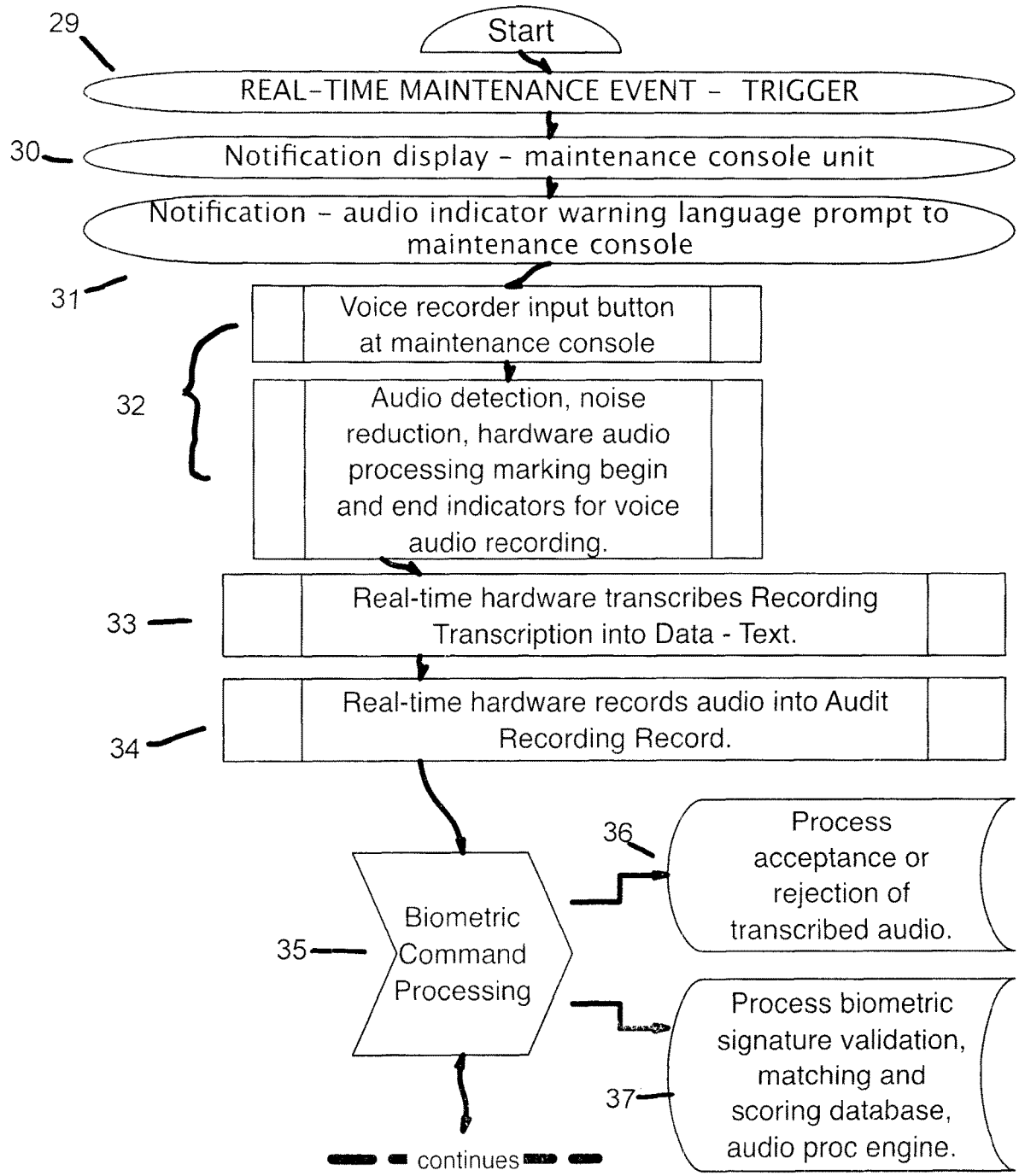
FIGS. 5a, b and c illustrate the invention's method for conducting an auditing activity wherein the electronic devices are console-mounted in air vehicle or similar transportation land/space/air equipment control environments.
Figure 5:
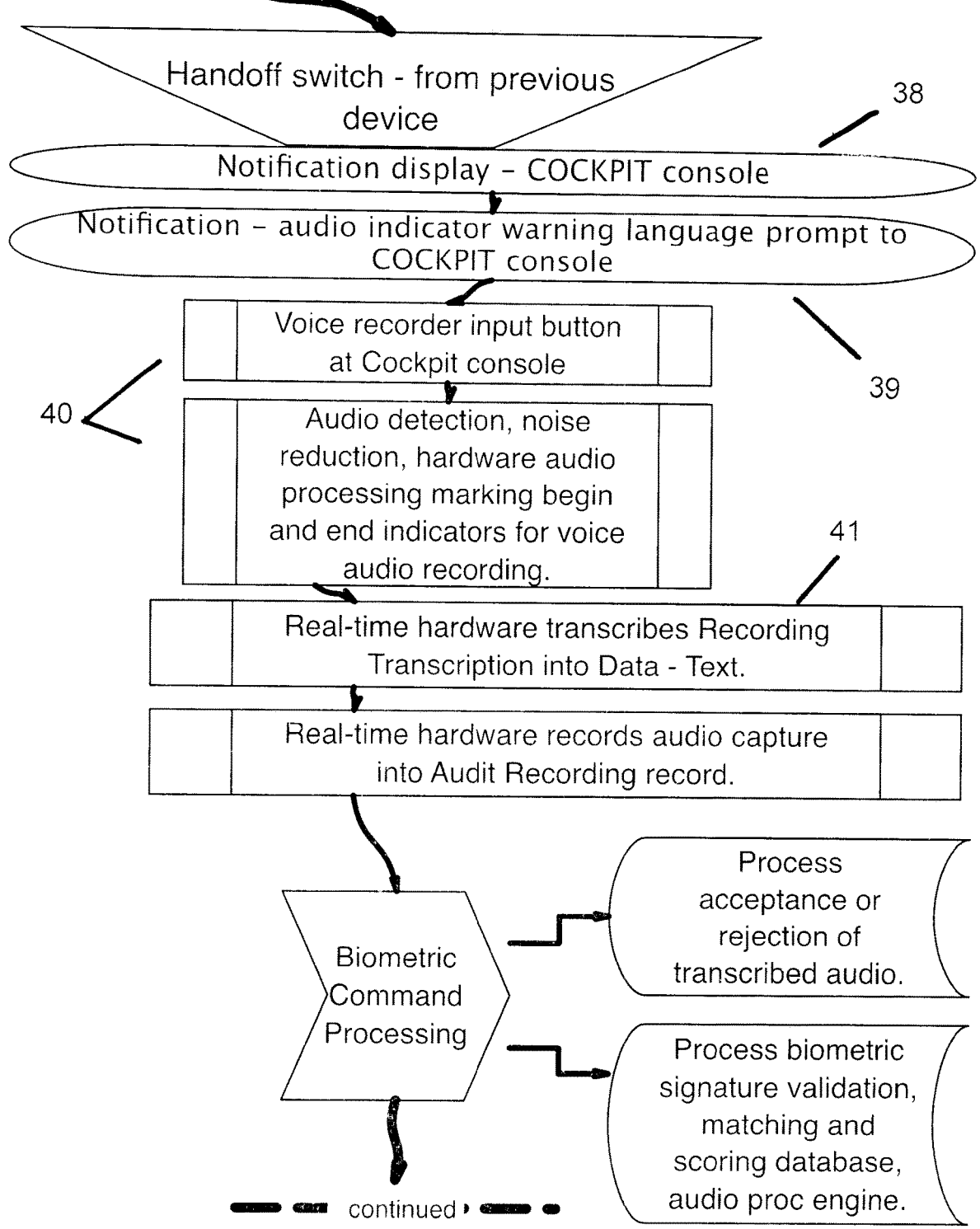
Figure 5:
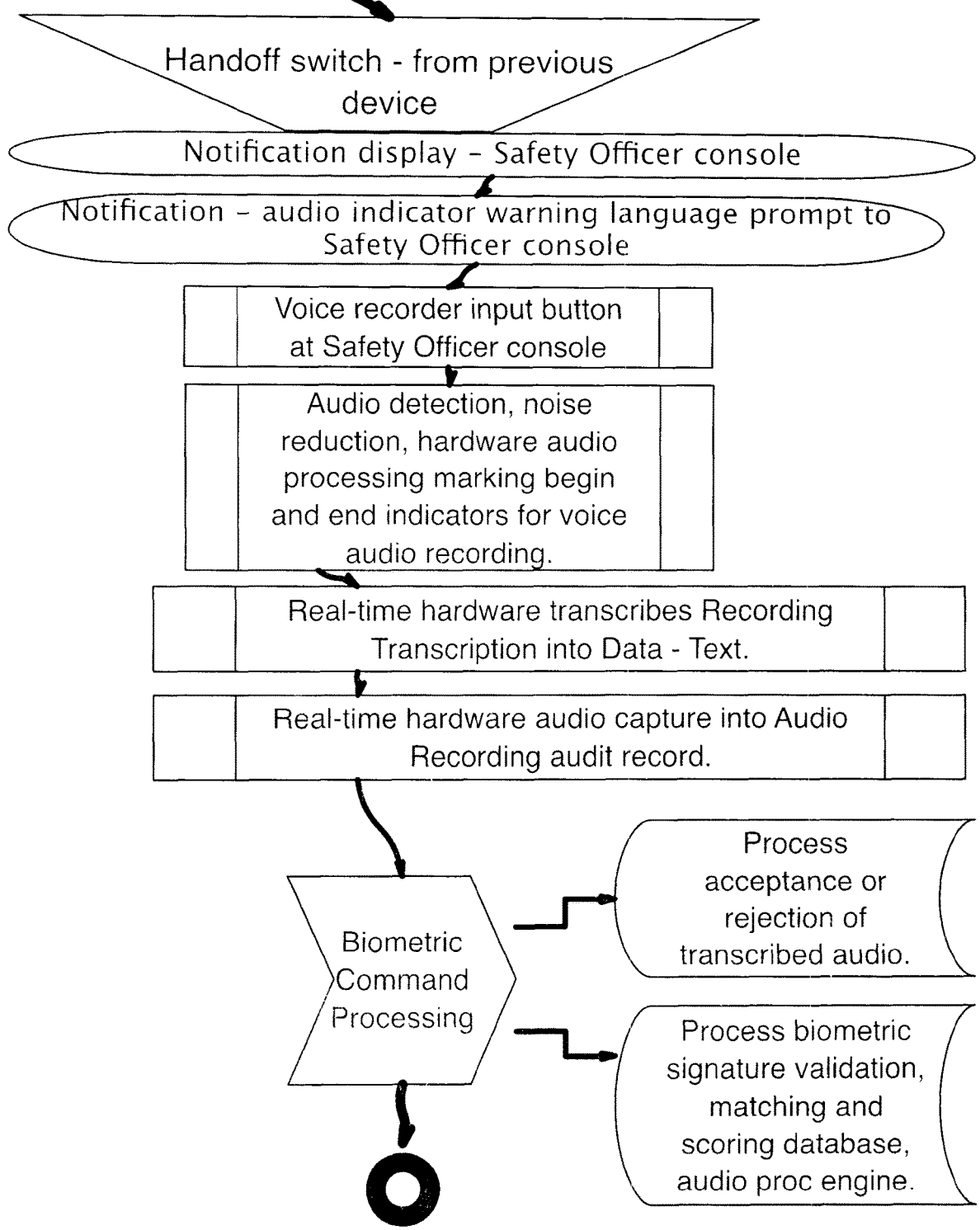

FIGS. 5a, 5b, and 5c illustrate an alternate procedure in which a supervisory console unit, rather than a mobile device, typically located at ground level and maintained by a maintenance officer, is employed. That console receives at 30 the generated maintenance event message 29, along with a requirement for receipt confirmation. The console issues a prompt for the officer to confirm receipt at 31 and records and confirms the officer's voice response at 32, incorporating noise reduction and related processing as known in the art to produce a recording suitable for transcription into text at 33, which can be displayed on the console's screen for confirmation by the officer that it has been recorded successfully. The console further processes the audio recording into a concatenated format in two parts. The first part is a biometric signature for identity validation and acceptance for the event transaction. The second part is a transcribed audio response in a machine-processable (text) format for formal acceptance or denial of the event. The audio is saved at 34, while the biometric signature is processed at 35 and accepted or rejected at 36 and identity matched at 37 to confirm the identity of the maintenance officer. The console then hands-off the event to the next console (or mobile device).

FIG. 5b illustrates the hand-off to a console, which in the embodiment may be located in the cockpit of the aircraft being maintained. Once again, a notification of receipt is displayed at 38, and a audio message is issued at 39, requesting aural confirmation of receipt. As with the prior console, the console records the receiving officer's voice response at 40, again incorporating noise reduction and related processing to produce a recording suitable for transcription into text at 41. As in the delivering console, the console further processes the audio recording into a two part concatenated format, with the audio being saved and the biometric signature being processed, accepted or rejected, and identity matched to confirm the identity of the receiving. The console then hands-off the event to the next console.

FIG. 5c illustrates the hand-off to the next console. As with the foregoing consoles, the intended recipient, such as a safety control officer, is prompted for an aural confirmation of receipt, which confirmation is processed analyzed and stored.

Figure 6:
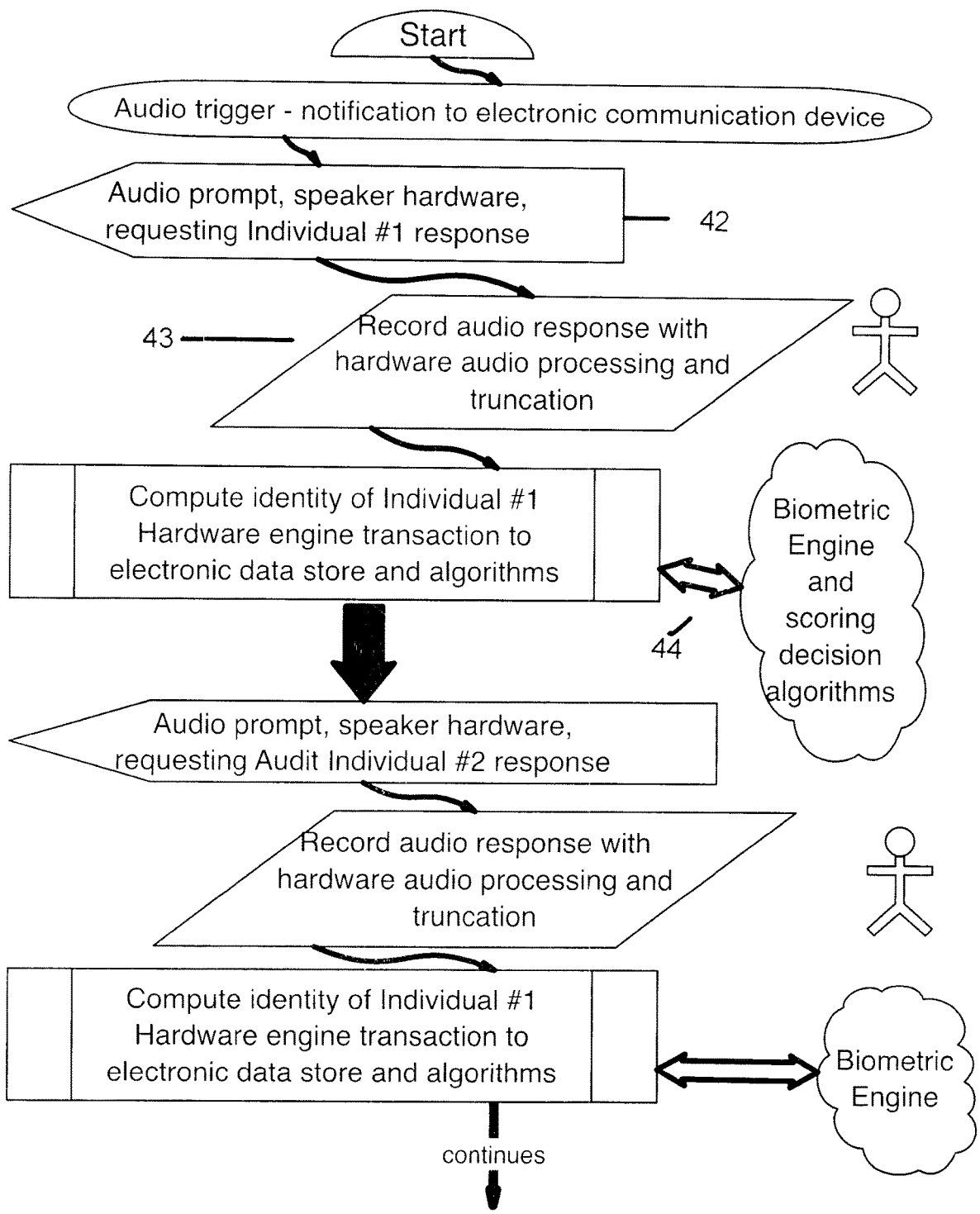
FIG. 6 illustrates the process for capture and processing a biometric signature of an involved individual.

FIG. 6 further details the flow for biometric signature capture, where an identity record is in the form of a voice recording, As shown in the figure, the system issues a request for a spoken response at 42, which is received and processed at 43. The recorded signature is then compared to a stored bank of "signatures" at 44 and verified. The verification process is then repeated with respect to the next individual in the chain and likewise through the chain. The resulting audio data stores into a permanent audit record of data and voice recording elements. It is to be recognized that analagous processing is employed for the receipt and verification of other biometric signatures, such as fingerprints, facial recognition, and eye iris scans.

Figure 7:
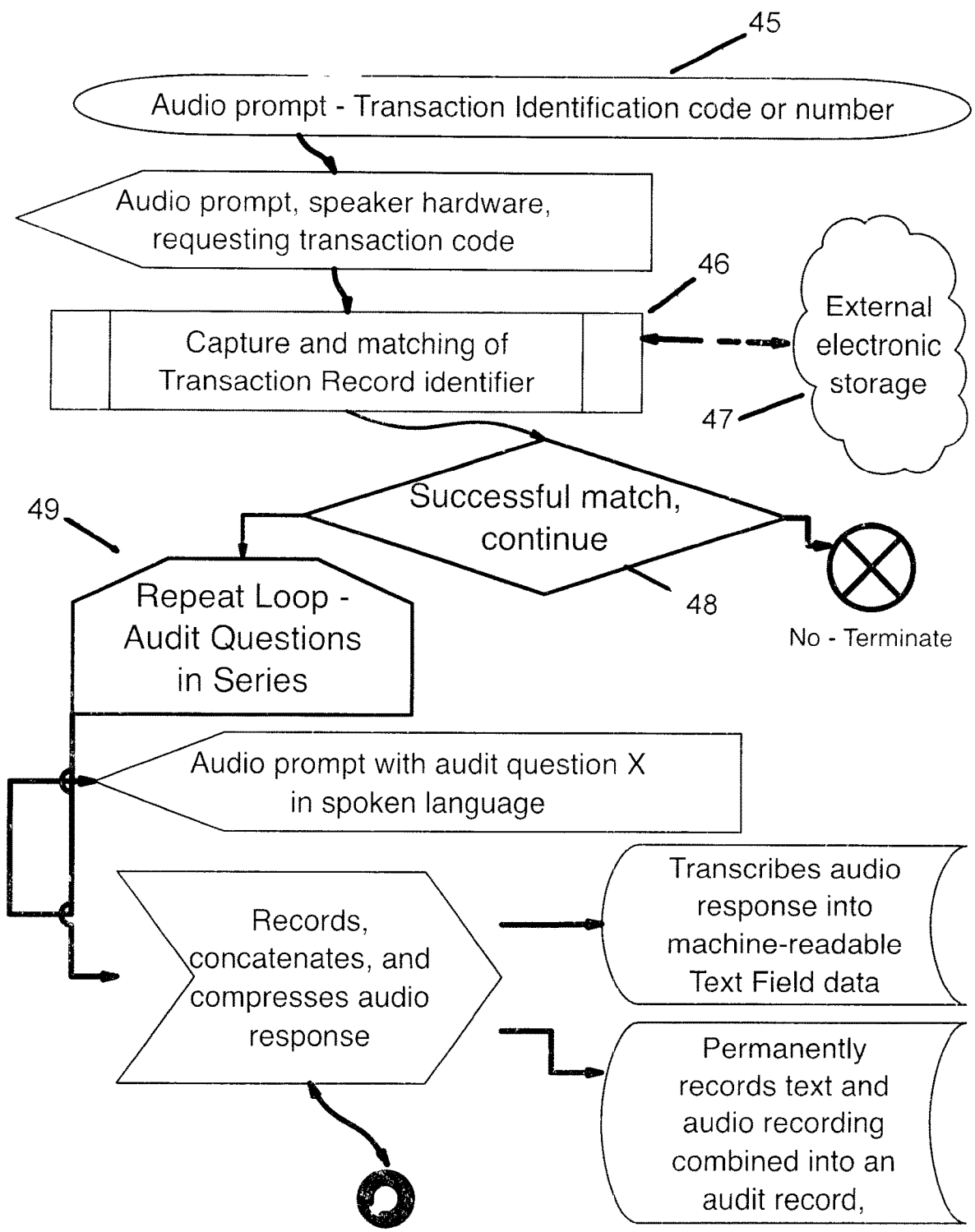
FIG. 7 illustrates an embodiment of the inventive methodology for capture and witness certifications for a series of audit acceptance questions, in series, resulting in a permanent record of data elements and voice recording elements.

For more detailed confirmation information from an individual, a mobile unit or console can be programmed to request further spoken responses from an individual. This is illustrated in FIG. 7. For example, the console or mobile unit may issue an audio prompt for the individual to confirm the identity of the maintenance event in process at 45. The individual responds response is captured at 46 and may be stored at 47. Once the identity is confirmed at 48 the system may ask at 49 a series of questions concerning the event and the individual's required verification actions, each of which are recorded and stored as illustrated in the Figure. The questions may preferably be in the form to require a true/false or yes/no response to simplify the receipt and processing.

Figure 8:
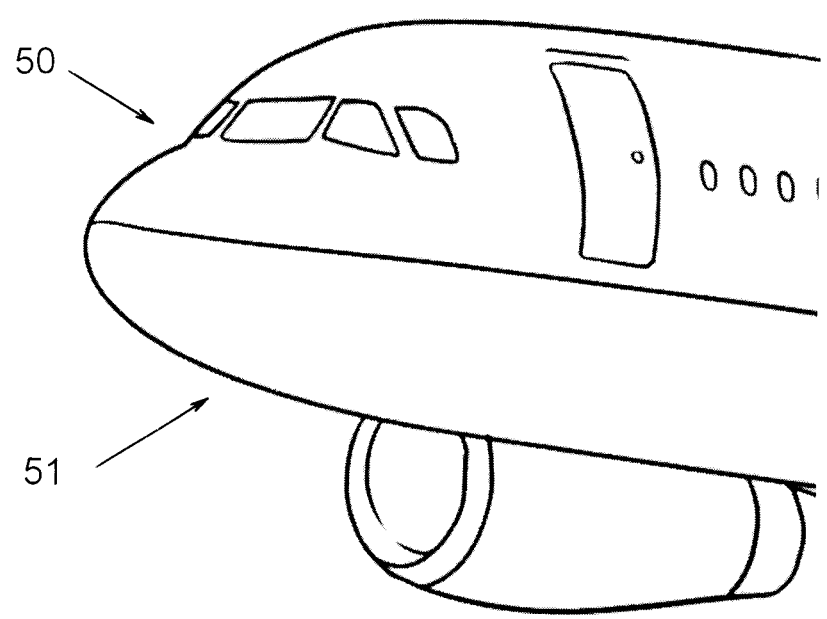
FIG. 8 illustrates potential mounting locations for elements of the present invention within an air vehicle, specifically wherein the invention's devices simultaneously operate from an inside control cockpit and from external maintenance panels in various locations at ground level and internal to the air frame.

FIG. 8 illustrates an embodiment for the system in which the electronics units to be utilized by the individuals in a verification chain are incorporated into an air vehicle. In such an embodiment the system may includes unit functionality incorporated into an inside control cockpit 50 and in external maintenance panels in various locations 51 at ground level that can be either external or internal to the air vehicle, depending on the nature of the involved individuals in the verification process intended to access the electronics units.

The system of the present invention automates the maintenance verification process for a variety of vehicles, providing secure confirmation and validation of the identities of the individuals involved in the verification process s well as complete documentation and storage of the process. It can me implemented with hardware and software as known in the art, and can be adapted to incorporate further advances in the relevant arts.

What is claimed is:

1. A system for recording and confirming the verification of a performance of a procedure monitored by the system, the system comprising:
   a first mobile electronic unit associated with an aircraft individual, having means for establishing and maintaining wireless communications with one or more fixed electronic units disposed proximal to at least one of a service and maintenance area in an airframe of an aircraft;
   a display disposed in at least one of the first mobile and one or more fixed electronic units, capable of displaying information associated with steps of the procedure being monitored;

control means for accepting or rejecting a confirmation from the first mobile electronic mobile unit by the aircraft individual, the performance of the steps of the procedure;

at least one receptor in the one or more fixed electronic units for accepting a biometric identifier of the aircraft individual; and means for transmitting data associated with the confirmation to at least one of the mobile electronic unit and a remote data collection device, wherein the procedure being monitored is at least one of a service and maintenance event being performed adjacent to a corresponding fixed electronic unit.

2. The system of claim 1, wherein the display is configured to display event codes and a descriptions for the at least one of the service and maintenance event.

3. The system of claim 1, wherein there is a plurality of mobile units, and each of the mobile electronic units and the at least one fixed electronic units are configured to be in a daisy chain sequence with the other electronic units in the system.

4. The system of claim 2, further comprising a second mobile unit, wherein the first electronic unit is associated with a pilot of an aircraft subject to the at least one of the service and maintenance event and the second mobile electronic unit is associated with a maintenance engineer.

5. The system of claim 1, wherein the at least one receptor comprises at least one of a video recorder, an audio recorder, a fingerprint recorder, a face-scan recorder, and an iris recorder.

6. The system of claim 1, wherein at least one of the electronics units further include a proximity detector for detecting the proximity of at least one of the other electronics units in the system.

7. A method for verification of the performance of a service or maintenance event when the service or maintenance event requires verification by a plurality of individuals, comprising the steps of:

associating each of the individuals with a mobile electronics device;

programming each of the mobile electronics devices with information associated with the service or maintenance event;

issuing a query from each of the electronics devices to the associated individual for confirmation of the performance of the service or maintenance event;

receiving and recording by each of the electronics devices the confirmation issued by the associated individual and personal identification data associated with the individual;

confirming the identities of the individuals via one or more fixed electronic units disposed proximal to at least one of a service and maintenance area in an airframe of an aircraft;

identifier of the aircraft individual, wherein a biometric reader is disposed in at least one of the mobile devices and one or more fixed electronic devices; and wirelessly transmitting the confirmation data to a remote location for storage.

8. The method of claim 7, wherein the receiving and recording of the confirmation issued includes recording a voice response from the individual.

9. The method of claim 7, wherein the receiving and recording of the personal identification data includes obtaining a biometric identifier of the individual.

10. The method of claim 9, wherein the biometric identifier comprises at least one of a voice response from the individual, a fingerprint scan of the individual, and an iris scan of the individual.

11. The method of claim 7, wherein the query issued by at least one of the electronics units includes issuing a series of questions associated with the performance of the service or maintenance event to be responded to by the individual.

* * * * *